June 1, 1943.  C. H. RIPPL  2,320,655
PERIODICALLY OPERATING ELECTRIC SWITCHES
Filed Jan. 13, 1937  2 Sheets-Sheet 1
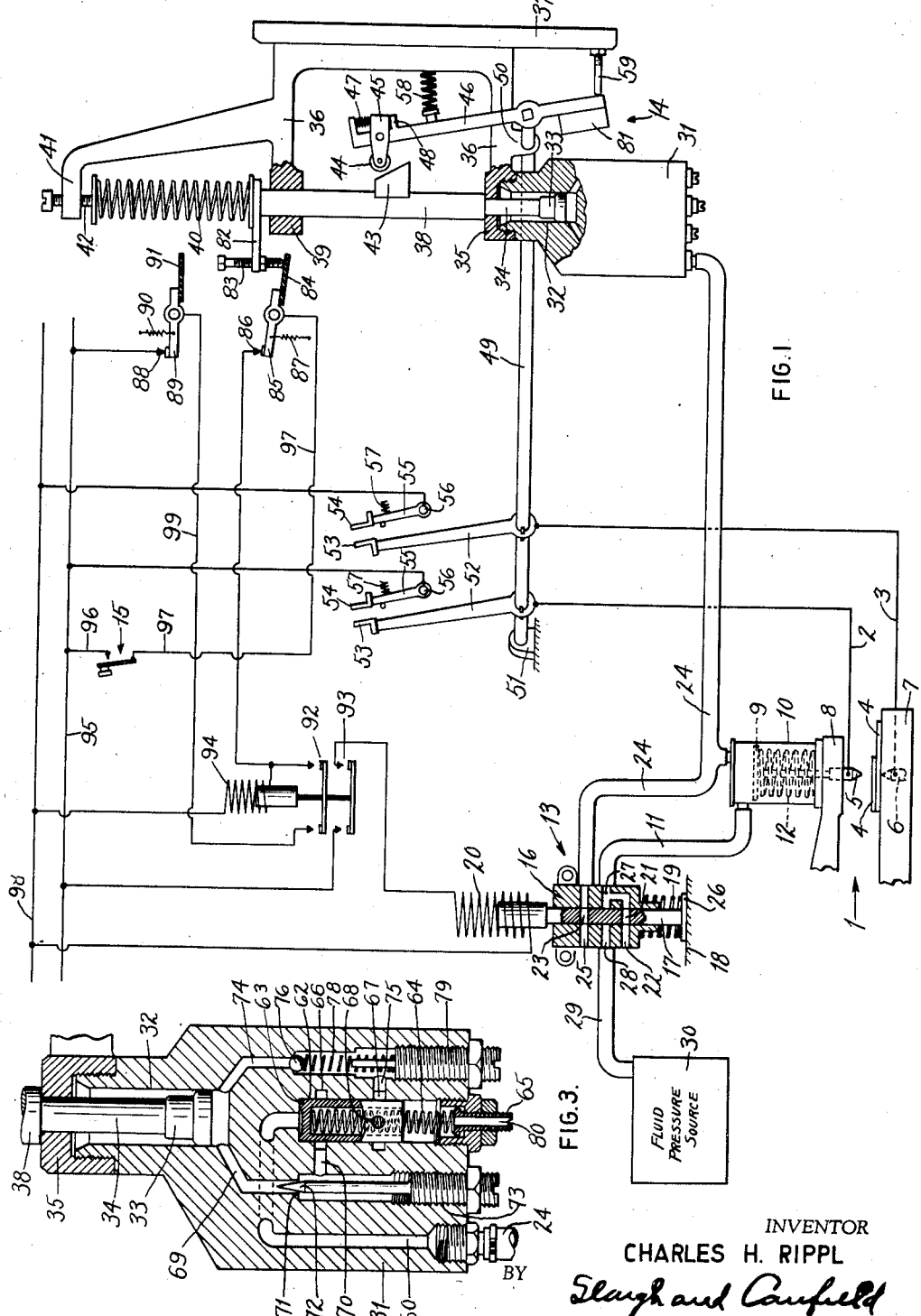
INVENTOR
CHARLES H. RIPPL
BY Slaugh and Canfield
ATTORNEY.

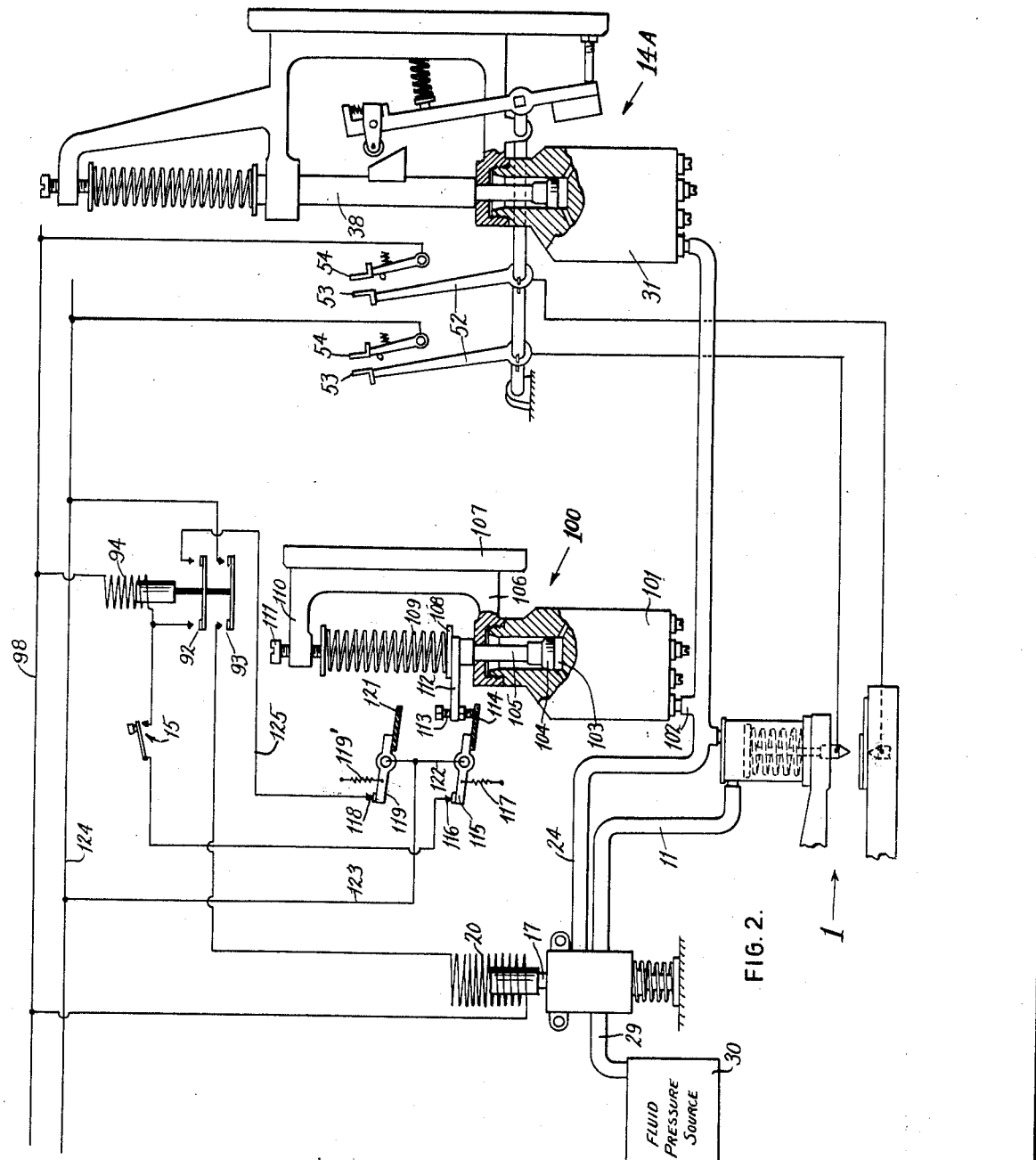

Patented June 1, 1943

2,320,655

UNITED STATES PATENT OFFICE 2,320,655

PERIODICALLY OPERATING ELECTRIC SWITCH

Charles H. Rippl, Cleveland, Ohio, assignor to The Clark Controller Company, Cleveland, Ohio, a corporation of Ohio Application January 13, 1937, Serial No. 120,360

28 Claims. (Cl. 175—375)

This invention relates to timing apparatus and particularly to apparatus for timing the closing and opening of an electric switch controlling an electric circuit to cause a succession of timed current impulses to flow in the circuit.

My invention is particularly applicable to controlling electric welding current supplied to a welding apparatus of the type arranged to make a single weld or a rapid succession of like or similar welds, for example, spot welds. And while my invention may be applied to other arts in which a succession of timed current impulses is utilized, it will be illustrated and described herein as applied to electric welding.

It is among the objects of the invention:

To provide an improved control for effecting the periodic closing and opening of an electric switch.

To provide an improved electric switch construction by which a succession of timed electric current impulses may be caused to flow in an electric circuit.

To provide in connection with an apparatus utilizing at successive operations thereof successive current impulses of timed duration, improved means to insure the operation of the apparatus in timed relation to the initiation and duration of the current impulses.

To provide an improved welding current control whereby single impulses or a succession of impulses of timed duration may be supplied to a welding machine in timed coordination with successive work engaging operations of the machine in an improved manner.

To provide in connection with a pneumatically operated welding machine an improved electro-pneumatic control for operating the machine and a current controlling switch to cause the switch to supply to the machine a timed succession of timed current impulses in timed coordination with operations of the machine in an improved manner.

To provide an improved electro-pneumatic control for effecting successive operations of a pneumatically operated electric switch to cause it to supply a timed succession of electric current impulses of timed duration to an electric circuit.

Other objects will be apparent to those skilled in the art to which my invention appertains.

My invention is fully disclosed in the following description taken in connection with the accompanying drawings in which:

Fig. 1 is a view generally diagrammatic illustrating an embodiment of my invention in one form applied to the control of the time duration of a timed succession of electric current impulses supplied to a pneumatically operated welding machine;

Fig. 2 is a view similar to Fig. 1 but illustrating a modification;

Fig. 3 is a view illustrating in longitudinal section and to an enlarged scale the interior of a valve housing illustrated in elevation in Figs. 1 and 2.

Referring to the drawings I have shown generally at 1 a welding machine to which, in the practice of my invention to be described, current impulses are supplied over wires 2 and 3. The welding machine 1 may be of the well known form illustrated in which work pieces 4—4 to be welded may be placed and a weld effected by electrodes 5 and 6 connected to the said wires. Such machines are well known in this art and a complete illustration and description thereof is deemed unnecessary. The particular machine shown is illustrated diagrammatically and comprises a base or lower head 7 with which is associated one of the electrodes, 6, the other electrode, 5, being vertically reciprocable in an upper head 8 by a pneumatic piston 9 reciprocable in a cylinder 10, downwardly, by fluid pressure such as compressed air admitted to the cylinder 10 through a conduit 11, and upwardly, by a spring 12 when the pressure is removed, the electrode 5 being connected to the piston 9.

The apparatus to be described controlling the supply of compressed air to the conduit 11 and controlling the welding current comprises, among other things, an air pressure control valve shown generally at 13 and a current timing switch apparatus shown generally at 14, and a master control operator's switch 15.

As will appear from the description to follow, upon manual operation of the switch 15 to close it, the valve 13 will be electro-magnetically operated to supply compressed air from a source to the welding machine 1 to engage the electrodes 5—6 with the work 4 and to also supply compressed air to the timing switch 14 which closes and then opens again, sending an impulse of welding current through the machine 1; and the valve 13 will then operate to effect separation of the electrodes 5—6; and so long as the switch 15 remains closed, these functions will be repeated, the electrodes closing, current flowing therethrough, the current being broken and the electrodes separating; the periodicity or rapidity of the recurring cycles of operations being determined by the inherent inertia of the parts and the rate at which pneumatic pressure builds up and dies out in the system upon operations of the valve 13. In the form to be described in connection with Fig. 2, the periodicity of the repeating cycles of operations is itself timed by another apparatus.

In either the form of Fig. 2 or the form of Fig. 1 now under consideration, the timing switch 14 cannot operate to close the welding circuit until after the electrodes are engaged; and the current is always broken before the electrodes disengage. Furthermore as will appear hereinafter, even if the operator's switch 15 be closed and then immediately opened, the parts will go through a single cycle of electrode engagement, flow of welding current impulse, breaking of the welding current, and restoring of the electrodes; and then the functioning of the parts will cease; and if the operator's switch be prematurely closed again it is ineffective to function until after the timing switch has fully operated to not only make but to break the current.

The pressure control valve shown generally and diagrammatically at 13 comprises a cylinder 16 in which reciprocates a valve stem and plunger 17 normally held downwardly upon a stop 18 by a spring 19 and stopped in its upward movement by engagement of a flange 26 on the lower end of the stem with the lower end of the cylinder 16 as shown. The stem may be moved upwardly by the energization of an electro-magnetic winding 20.

The valve stem has a port 21 which in the normal position of the stem effects communication of the conduit 11 with the atmosphere to exhaust the cylinder 10 by way of an exhaust duct 22 and has a port 23 through which a conduit 24 to be referred to exhausts to atmosphere by way of a duct 25.

When the valve stem 17 is moved upwardly it shuts off the port 23 and positions the port 21 to connect the conduit 11 to a conduit 29 by way of ducts 27 and 28, the conduit 29 being connected to a source of fluid pressure, such for example as a tank of compressed air 30. The conduit 24 is connected to the cylinder 10 and receives compressed air therefrom supplied thereto by the conduit 11 and therefore the air in the conduit 24 is at first at a reduced pressure which builds up as the pressure in the cylinder 10 builds up and moves the piston 9 therein. The pressure in the conduit 24 therefore does not reach its final value until after the piston has moved downwardly.

The compressed air or other fluid under pressure thus admitted to the conduit 11 operates the electrode 5 as above described. And the fluid pressure, when admitted to the conduit 24, causes the compressed fluid to flow into a valve housing 31 having in the upper portion thereof a cylinder 32 in which reciprocates a piston 33 on the lower end of a piston rod 34, the rod being guided in a boss 35 formed on a bracket 36 secured to a panel or other support 37.

Above the boss 35, the rod is enlarged to form a plunger resting normally downwardly upon the upper side of the boss 35. The upper end of the plunger 38 is guided in a boss 39 on the bracket 36. Above the boss 39 is a spring 40 reacting downwardly on the upper end of the plunger 38 and upwardly upon an arm 41 on the bracket 36 provided with a screw 42 by which the downward force of the spring 40 may be adjusted.

The plunger 38 has a cam 43 mounted on a side thereof below a roller 44 on a ratcheting element 45 pivotally connected to an arm 46. A spring 47 reacting upon an overhanging upper end portion of the arm 46 and upon a rearward portion of the ratchet 45 normally holds the ratchet against a stop 48.

The arm 46 is secured to an oscillatory shaft 49 supported in a bearing 50 on the bracket 36 and on a suitably spaced bearing 51.

A pair of switch arms 52—52 are rigidly connected to the shaft 49 and carry, on their upper ends, movable contacts 53—53. Contacts 54—54 engageable by the contacts 53—53 are supported each upon an arm 55 which is preferably supported on a pivot 56—56 and yieldable against the tension of a spring 57.

In the operation of the timing switch 14 as thus far described, when fluid under pressure is admitted to the cylinder 32 from the conduit 24, the piston 33 is moved upwardly against the tension of the spring 40 and the cam 43 engages the roller 44 and rocks the arm 46, clockwise as viewed in the drawing, causing the switch arms 52 to effect engagement of the contacts 53—54. The cam 43 passes beyond the roller 44 and the arm 46 is then rocked counter-clockwise by a spring 58 reacting on the bracket 36 and on the arm, which rocks the shaft 49 in the other direction to separate the engaged contacts. The arm 46 and therefore the shaft 49 are stopped in a predetermined switch open position by the engagement of a part of the arm 46 below the shaft with a stop 59 on the support 37.

When pressure is removed from the cylinder 32, the spring 40 aided by gravity returns the plunger 38 downwardly and the cam, engaging the roller 44, rocks the ratchet arm 45 against the pressure of the spring 47, out of the path of the cam 43 so that in the return direction the plunger 38 does not operate the switch arm 46 or the contacts controlled thereby.

The timing switch 14 thus far described, with the exception of the parts within the valve housing 31 presently to be described, is not in itself an essential part of the present invention, the switch itself constituting the subject matter of the co-pending application of Edward G. Beiderman Serial No. 84,981, filed June 13, 1936, for improvements in "Time controlled electric switches," since matured into Patent No. 2,196,488, dated April 9, 1940, and is claimed therein.

The valve housing 31 and the parts therein are shown in one arrangement in Fig. 3. While this arrangement which will now be described is practical and operative for the intended purposes herein, the preferred arrangement is that shown and described in the co-pending application of Charles H. Rippl, Serial No. 120,362, filed January 13, 1937, for improvements in "Pressure controls for pneumatically operated switches," since matured into Patent No. 2,172,261, dated September 5, 1939, and is claimed therein; and inasmuch as the particular valve arrangement in the housing 31 does not in itself constitute an essential part of the present invention, reference may be had to that application for the preferred form; and the electric current camming switch indicated generally at 14 as controlled by the valve arrangement in the housing 31 is also claimed as such in said co-pending application.

Referring now briefly to the valve arrangement within the housing 31, the conduit 24 communicates with a duct 60 which communicates at the inner end portion of the duct with a cylinder 62 in which reciprocates a piston valve 63 of tubular form closed at its upper end. A spring 64 in the valve, abutting at its upper end upon the valve's closed end and at its lower end upon a hollow stud 65, normally holds the valve upwardly to seal the end of the duct, the spring tension being adjustable by the threaded stud 65.

An upper and a lower annular chamber, 66 and 67, open into the cylinder 62 and are normally closed off by the valve 63, the valve having a port 68 through the wall thereof normally communicating with the annular chamber 67.

A duct 69 communicates with the cylinder 32 above described and communicates at its lower portion through a duct 70 with the annular chamber 66, the duct having a valve seat 71 and a needle valve 72 controlling the opening through the seat 71, the needle valve 72 being adjustable by a threaded lower end portion 73 threaded into the housing 31.

The cylinder 32 has an exhaust outlet duct 74 which communicates with the annular chamber 67 by a duct 75, the duct 74 being normally closed by a ball check valve 76 held in closing position by a spring 78 on a spring adjusting screw 79.

In the operation of the parts in the valve housing 31 above described, when fluid under pressure, such for example, as compressed air, is admitted to the conduit 24, it flows through the duct 60 to the top of the cylinder 62. The valve 63 is retained in its upper duct closing position until the pressure has risen to a predetermined operating value determined by adjustment of the valve spring 64 whereupon the pressure moves the valve 63 downwardly and opens the annular chamber 66 whereby the air under pressure is admitted through the valve seat 71 to the duct 69 and to the piston cylinder 32, and piston 33 moves upwardly as above described, the rate of movement being determined by the adjustment of the needle valve 72 to suitably retard the movement of the piston 33.

When, as above described, pressure is cut off from the conduit 24 and it is exhausted to the atmosphere through the valve 13, the piston 33 is returned downwardly by the spring 40, and the valve 63 is moved upwardly by the spring 64 to open the port 68.

Thereupon the air from the cylinder 32 discharges through the duct 74 and the duct 75 and annular chamber 67 through the port 68 to the inside of the valve 63 and thence downwardly through the tubular stud 65 which has a duct 80 therethrough for the purpose. By this means the discharge from the cylinder 32 is instantaneous and the admission of air thereto is timed as described.

When the admission of air to the cylinder 32 by adjustment of the needle valve 72 is very slow, there may be sufficient leakage out through the duct 74 and around the valve 63 to relieve the pressure, and to prevent such leakage the check valve 76 is provided.

As will now be apparent, the velocity of the plunger 38 carrying the cam 43 will be uniform for successive operations inasmuch as it is moved always by the same pressure, determined by the valve 63 and the rate of movement of the plunger 38 may be adjustably controlled by the needle valve 72. Successive current impulses therefore will all be of the same length. For any given rate of movement of the plunger 38, the length of the impulse will be determined by the time during which the roller 44 is engaged with the cam 43. For relatively long impulses, the arm 46 will be moved by the spring 58 to break the current the moment the cam 43 leaves the roller 44. For more rapid movement of the plunger 38, the inertia of the arm 46 will cause it to continue to move after the roller 44 has left the cam 43, effecting a more yielding movement of the arms 55—55 against their springs 57—57; and this inertia movement may be adjusted by means of an adjustable weight 81 on the lower end of the arm 46 and by the tension of the spring 58. In any case, the movement of the plunger 38 will be returned by the spring 40 and during the upward movement of the plunger the opposition by the spring will also control the velocity of the plunger; these features which control and adjust the time duration of the current impulse being more fully described in the above mentioned pending patent applications.

The means by which periodic repeating by the machine 1 and by the timing switch 14 is effected will now be described.

On the upper end of the plunger 38 is secured an arm 82 having in the end thereof an adjustable screw 83. The lower end of the screw rests upon a tailpiece 84 of a pivotally supported switch arm 85 engaging on its upper side a contact 86 and urged to move to break connection with the contact by a spring 87, the contact being maintained by the downward normal position of the screw 83.

Spaced above the contact 86 is a contact 88 normally engaged by a pivoted switch arm 89 and constrained yieldingly to effect said engagement by a spring 90, the switch arm having a tailpiece 91 in the path of movement of the screw 83.

By this arrangement when the plunger 38 moves upwardly it first breaks contact at 86 and at an upper point in its stroke breaks contact at 88, the contacts and switch arms preferably being disposed so that the upper contact 88 will be disengaged at a point in the movement of the plunger 38 after the cam 43 has left the roller 44, or after the contacts 53—54 have been disengaged.

At 92 and 93 are switches arranged to be closed electromagnetically by a winding 94. The functions of the above mentioned parts will be described in connection with the following description of their operation.

Upon closing the operator's switch 15, current flows from a current supply main 95 by a wire 96, through the switch 15 and by a wire 97 to the switch arm 85 and thence through the contact 86 to the winding 94 and thence back to the other supply main 98 thus energizing the winding 94 and closing the switches 92—93.

The switch 93 energizes the valve winding 20 and operates the valve 13.

The switch 92 closes a holding circuit for the winding 94 as follows: From the main 95 through the contact 88 and switch arm 89, through a wire 99 and thence through the switch 92 and the winding 94 to the other main 98 so that the operator's switch 15, even if it be opened at this time, does not disturb the energization of the valve winding 20. The valve 13 admits air to the switch cylinder 32 as above described and the plunger 38 moves upwardly; and by thereby removing the screw 83 from the tailpiece 84 allows the circuit to be broken at the contact 86 so that even if the switch 15, which may be open, be again closed, it will be without effect. When the plunger 38 reaches the upper portion of its stroke and the screw 83 engages and moves the tailpiece 91, the circuit to the contact 88 is broken and the winding 94 is therefore de-energized and the switches 92 and 93 open and the winding 20 is de-energized and the valve 13 reset. If at this time the switch 15 were still closed, the cycle would be repeated.

To resume therefore, upon each closure of the operator's switch 15, the valve 13 operates to admit air pressure to the cylinder 10 of the machine 1. The movement of the piston 9 in the cylinder 10 temporarily prevents the development of full pressure on the electrodes and in the conduit 24; but when the electrodes 5—6 have been engaged with the work and the pressure builds up in the cylinder 10 and in the conduit 24, and in the valve housing 31, to the value for which the valve 63 is adjusted, then the switch timing mechanism 14 will operate to send a welding impulse of current through the mains 2—3 and the electrodes 5—6 and at the upper portion of the stroke of the plunger 38 which operates the switch, the valve 13 will be reset to cut off the pressure from the switch and from the machine, and it is during this stroke of the plunger 38 that the welding circuit is not only made but also broken; and if the operator's switch is left in the closed position, then after the plunger 38 returns downwardly and closes the circuit at 86—85, the cycle will repeat and so on continuously.

The duration of each current impulse is the same as each of the others and the current cannot flow until after the electrodes 5—6 have been fully engaged with the work; and the electrodes 5—6 cannot open again until after the current has been broken. But if desired a single welding operation may be performed by momentarily closing and then opening the switch 15.

Also as will now be apparent, when the relay or contactor energized by the winding 94 has once been operated by the operator's switch 15, it will remain operated independently of the switch 15, and maintain the fluid pressure communicated to the timing mechanism 14 until after the latter has both made and broken the current impulse.

In the embodiment of my invention illustrated diagrammatically in Fig. 2, an additional pressure timing apparatus shown generally at 100 is utilized to time the operation of the machine 1 to further insure that the contacts of the switch supplying current to the machine 1 will be fully separated before the initiation of the next successive operation of the apparatus and to time the successive operations of the machine 1, that is to say, to time the periodicity of the successive welding cycles, and to hold the electrodes 5 and 6 of the machine 1 in engagement with the work for a time interval after interruption of the welding current impulse.

In this form the valve 13 and machine 1 may be the same as those described in connection with Fig. 1 and the current timing switch 14A may be the same as the switch 14 of the first form with the exception that the auxiliary switches operated by the plunger 38 of the first form are, in this case, omitted from the switch 14A and switches similar thereto are operated by the timer 100, and the latter will now be described.

A valve housing 101, which is preferably identical with the valve housing 31 above described, is connected to the conduit 24 by a branch conduit 102. In the cylinder 103 of the housing 101, a piston 104 reciprocates having a piston rod 105 guided in a frame 106 secured to a panel 107 or other suitable support. A head 108 on the rod 105 above the frame 106 supports the piston, the piston being normally held downwardly by spring 109 reacting at its lower end upon the head 108 and at its upper end upon a bracket 110 secured to the panel 107 and provided with an adjusting screw 111 to adjust the spring pressure.

An arm 112 extending laterally from the head 108 carries a screw 113 which, in the normal downward position of the head 108 engages the tailpiece 114 of a pivotally mounted switch arm 115 normally engaged with a contact 116 and urged by a spring 117 to move away from the contact.

Above the contact 116 is a second contact 118 engaged by a pivoted arm 119 urged by a spring 119' into such engagement, the switch arm 119 having a tailpiece 121 in the upward movement path of the screw 113.

In the operation of this embodiment of my invention, when the oeprator's switch 15 is closed, current flows from a supply main 98 through the switch winding 94, through the switch 15 to the contact 116 and through the switch arm 115 and a connecting wire 122 and a wire 123 to the other supply main 124. This closes switches 92 and 93, the switch 92 providing a holding circuit for the winding 94 from the main 98 through the winding 94, switch 92, by wire 125 to the contact 118 and thence through the arm 119 and wire 123 to the other main 124.

The closure of the switch 93 energizes the valve winding 20 and operates the valve as described in connection with the first form which admits pressure to the conduits 11 and 24, that in the conduit 11 operating the machine 1 and that in the conduit 24 flowing to the valve housing 31 of the switch 14A to operate the switch contacts 53—54, and the compressed air flowing from the conduit 24 to the branch conduit 102 and through the housing 101 to the cylinder 103 moving the piston 104 and head 108 upwardly.

The valve structure of housing 101 as described above in connection with Fig. 3 will time the upward movement of the head 108 and while it is moving upwardly, the switch 14A operates and engages and disengages its contacts 53—54 and thereby sends an impulse of welding current to the machine 1. In the first part of the movement of the head 108, contact is broken at the contact 116 so that the winding 94 cannot again be energized if once de-energized until the head 108 has fully returned to its downward position.

When the arm 112 reaches an upper position, the screw 113 engaging the tailpiece 121 breaks the circuit at the contact 118 and since contact has already been broken at the contact 116, the winding 94 is de-energized and the switches 92 and 93 open which restores the valve 13 to restore the electrodes of the machine 1, by cutting off air to the conduit 11. By cutting off air to the conduit 24 also, the plunger 38 of the switch 14A is restored downwardly as is also the head 108 of the timer 100 and when the latter reaches its lower position, it again closes the circuit at the contact 116. If now the operator's switch 15 has remained closed, another like cycle will be repeated and so on successively; but if it were momentarily closed, a single cycle will be effected and the apparatus will return to its normal condition and stop there. The head 108 continues to move upwardly after the current impulse has been broken at the contacts 53—54 and during this latter part of its stroke maintains the pressure at the machine 1 and holds the electrodes 5—6 engaged with the work. Such holding, after the weld has been effected allows the weld to set and cool under pressure, and this time period of such holding is sometimes referred to as a "cold-hold" period.

From this brief description in connection with the more complete description of the first form, it will be understood that after the electrodes of the machine 1 have engaged the work, the switch 14A will operate sending the welding current impulse to the machine; and then the switch 14A will open its contacts; and by suitable adjustment of the needle valve 72 in the valve housing 101, the timer 100 will operate subsequently and after a time interval to restore the parts including the machine 1 for another cycle of operations. In other words, the parts are not restored for another cycle until the head 108 has moved to its upper position which may be delayed to any extent desired by the adjustment provided.

In connection with either of the forms of Figs. 1 or 2, a welding device of the portable type referred to in the art as a "gun" may be employed instead of the larger and more usually stationary type illustrated generally at 1, and, in the case of either type of welding device, the switch 15 may be mounted directly upon or closely adjacent to the device to be convenient to the operator of the device. Also while the electrodes 5 and 6 are illustrated as connected directly to the current supply mains 95 and 98, it will be understood that they may be energized by the secondary of a transformer, the primary of which is connected to the mains 95 and 98 according to well known practice.

In both forms of the invention also, as will be clear from the foregoing, the switch mechanism 14 or 14A cannot operate until after the electrodes 5 and 6 have been fully engaged with the work and the back pressure has built up to a predetermined value in the conduit 24; and in the form of Fig. 2, the timing device 100 also does not operate until the pressure has likewise built up and the electrodes cannot again be operated until the timing device 100 has fully operated.

My invention is not limited to the precise embodiment illustrated and described. Changes and modifications may be made within the spirit of my invention without sacrificing its advantages and within the scope of the appended claims.

I claim:

1. In an electric switch mechanism, an operable switch, a main electric switch, normally restored auxiliary switch means, a normally restored fluid pressure operable means for operating the main switch and auxiliary switch means upon application of fluid pressure thereto, a source of fluid pressure and conduit means for communicating the pressure of the source to the pressure operable means, an electro-magnetic valve means for controlling the communication of pressure of the source to the conduit means, a source of electric current and circuit means by which upon operation of the operable switch, the latter jointly with the auxiliary switch means effects an operation of the magnetic valve means, to effect communication of pressure from the source to the conduit means and by it to the pressure operable means, to operate it to cause it to operate the main switch and auxiliary switch means, and the operated auxiliary switch means then effecting restoring of the magnetic valve means, which in turn discontinues communication of pressure to the pressure operable means causing it to be restored, the restoring of which effects restoring of the auxiliary switch means which, together with the operable switch again effects operation of the valve and pressure operable means and so on repeatedly so long as the operable switch is maintained operated.

2. In an electric switch mechanism, an operable switch, a main electric switch, an electromagnetic relay, normally restored auxiliary switch means, normally restored fluid pressure actuated means for operating the main switch and auxiliary switch means upon application of fluid pressure thereto, a source of fluid pressure and conduit means for communicating the pressure to the pressure actuated means to operate it, an electro-magnetic valve means for controlling communication of source pressure to the conduit means, a source of electric current and circuit means by which upon operation of the operable switch the latter jointly with the auxiliary switch means effects an operation of the relay which, in turn, effects an operation of the magnetic valve means to communicate source pressure to the conduit means and thereby effect communication of pressure from the source to the pressure actuated means to cause it to operate the main switch and auxiliary switch means, and the operated auxiliary switch means then effecting restoring of the relay and thereby restoring the magnetic valve means, which in turn discontinues communication of source pressure to the conduit means and thereby effects restoring of the pressure actuated means, the restoring of which effects restoring of the auxiliary switch means which together with the operable switch again effects operation of the relay and valve and pressure actuated means and so on repeatedly so long as the operable switch is maintained operted.

3. The mechanism described in claim 1 and in which the pressure operable means comprises an expansible and contractible chamber having a movable wall, and comprises mechanism means effective to both operate and restore the main switch upon movement of the movable wall which is effected by application of pressure to the pressure operable means upon operation of the magnetic valve means.

4. The mechanism described in claim 1 and in which the pressure operable means comprises an expansible and contractible chamber having a movable wall, and comprises mechanism means effective to both operate and restore the main switch upon movement of the movable wall in one direction effected by application of pressure to the pressure operable means upon operation of the magnetic valve means but ineffective to operate the switch upon return movement of the movable wall upon restoring the magnetic valve means.

5. The mechanism described in claim 1 and in which the pressure operable means comprises an expansible and contractible chamber having a movable wall, which moves upon communication of pressure to the pressure operable means by an operation of the valve and operates the main switch and auxiliary switch means.

6. The mechanism described in claim 1 and in which the pressure operable means comprises two expansible and contractible chambers having each a movable wall which moves upon communication of pressure to the chambers upon operation of the magnetic valve means, and one movable wall operates the main switch and the other operates the auxiliary switch means.

7. The mechanism described in claim 1 and in which an apparatus is provided comprising a fluid pressure means in which pressure builds up upon communication of fluid pressure thereto and the conduit means communicates pressure thereto from the fluid pressure source by operation of the magnetic valve and the fluid pressure which operates the pressure operable means is the said building up pressure.

8. In an electric mechanism, an operable electric switch, an electro-magnetic switch, a main switch, a pair of auxiliary switches, fluid pressure actuated means, a source of fluid pressure and conduit means for communicating pressure from the source to the pressure actuated means, an electro-magnetic valve controlling the communication of the pressure, a source of electric current, circuit means by which upon operation of the operable switch, the latter jointly with one of the auxiliary switches, effects operation of the electro-magnetic switch, and the latter effects operation of the electro-magnetic valve, the valve then effecting communication of pressure to the pressure actuated means, the pressure actuated means then operating the main switch and the said one auxiliary switch and subsequently operating the other auxiliary switch, and the other auxiliary switch when operated restoring the electro-magnetic switch and thereby restoring the electro-magnetic valve and thereby restoring the pressure actuated means, and the restoring of the latter effecting restoring of said one auxiliary switch to again effect operation of the electro-magnetic switch and so on, repeatedly operating the main switch so long as the operable switch is maintained operated.

9. The mechanism described in claim 8 and in which the pressure actuated means comprises an element movable alternately upon application of and removal of source pressure respectively, and mechanism means is provided which upon alternate movement of the movable element in one direction effects both an operation and a restoring of the main switch and is ineffective to operate it upon movement of the movable element in the alternate direction.

10. The mechanism described in claim 8 and in which the pressure actuated means comprises a cylinder and a reciprocable piston therein and mechanism means is provided operated by the piston in one direction of reciprocation to operate the main switch and the auxiliary switches and in the other direction of reciprocation to restore the auxiliary switches.

11. The mechanism described in claim 8 and in which the pressure actuated means comprises two cylinders and a reciprocable piston in each, and mechanism means is provided operable by one piston to operate the main switch and upon reciprocation of the other piston in one direction to operate the auxiliary switches and in the other direction to restore them.

12. The mechanism described in claim 8 and in which the pressure actuated means comprises two cylinders and a reciprocable piston in each, and mechanism is provided operated by one piston in one direction of movement to both operate and restore the main switch and being ineffective to operate it upon the return reciprocation thereof, and upon reciprocation of the other piston in one direction is operated to operate the auxiliary switches and in the other direction to restore them.

13. In a fluid pressure operable switch mechanism, a current timing switch comprising a switch operating member, a source of fluid pressure, a fluid pressure conduit means communicating with the source, an electro-magnetic valve arranged to admit fluid pressure from the source to the conduit means upon operation thereof, a source of electric current, conductors supplying current from the source to the valve, auxiliary switch means, an electro-magnetic relay having an energizing circuit normally supplied by current from the source under the control of the auxiliary switch means, and having contacts controlling the said conductors, and fluid pressure responsive means responsive to the admission of fluid pressure to the conduit means by an operation of the valve to effect successively an operation of the switch operating member, an operation of the auxiliary switch means to restore the relay, restoring of the valve by the relay, restoring of the switch operating member, restoring of the auxiliary switch means, operation of the relay, operation of the valve, and so on repeatedly.

14. The mechanism described in claim 13 and in which the said fluid pressure responsive means comprises a fluid pressure expansible and contractible chamber, connected to the conduit means, and the switch operating member is operatively moved by a movable wall of the chamber and the auxiliary switch means is operable by movement of the chamber wall.

15. The mechanism described in claim 13 and in which the said fluid pressure responsive means comprises a fluid pressure expansible and contractible chamber connected to the conduit means, and the switch operating member is operatively moved by a movable wall of the chamber and the auxiliary switch means comprises a plurality of switches successively operated by movement of the chamber wall.

16. The mechanism described in claim 13 and in which the fluid pressure responsive means comprises two fluid pressure chambers connected to the conduit means and the switch operating member is operatively moved by a movable wall of one chamber and the auxiliary switch means is operated by movement of a movable wall of the other chamber.

17. The mechanism described in claim 13 and in which the fluid pressure responsive means comprises two fluid pressure chambers connected to the conduit means and the switch operating member is operatively moved by a movable wall of one chamber and the auxiliary switch means comprises a plurality of switches successively operable by movement of the movable wall of the other chamber.

18. The mechanism described in claim 13 and in which a control contactor is provided to discontinue the supply of current to the valve to stop the said repeated operation after one or more operations.

19. In combination, an electric switch mechanism, fluid pressure responsive means to operate the switch mechanism when fluid pressure is communicated thereto and to effect restoring of the means when communication of fluid pressure is interrupted, fluid pressure conduit means communicating with the fluid pressure responsive means, a source of fluid pressure, a magnetic valve effective, when energized, to operate and admit fluid pressure of the source to the conduit means, a source of electric current, circuit means including the winding of the valve connected to the current source, auxiliary switch means controlling the circuit means, means to operate the auxiliary switch means responsive to communication of fluid pressure to the conduit means by the valve to effect de-energizing and restoring of the valve and interruption of pressure in the conduit means to effect restoring of the fluid pressure responsive means and restoring of the auxiliary switch means and re-energizing of the valve winding to effect another operation of the valve and switch mechanism and auxiliary switch means and so on repeatedly.

20. The mechanism described in claim 19 and in which the said fluid pressure responsive means comprises a fluid pressure expansible and contractible chamber, connected to the conduit means, and the switch mechanism is operated by a movable wall of the chamber and the auxiliary switch means is operable by movement of the chamber wall.

21. The mechanism described in claim 19 and in which the said fluid pressure responsive means comprises a fluid pressure expansible and contractible chamber connected to the conduit means, and the switch mechanism is operated by a movable wall of the chamber and the auxiliary switch means comprises a plurality of switches successively operated by movement of the chamber wall.

22. The mechanism described in claim 19 and in which the fluid pressure responsive means comprises two fluid pressure chambers connected to the conduit means and the switch mechanism is operated by a movable wall of one chamber and the auxiliary switch means is operated by movement of a movable wall of the other chamber.

23. The mechanism described in claim 19 and in which the fluid pressure responsive means comprises two fluid pressure chambers connected to the conduit means and the switch mechanism is operated by a movable wall of one chamber and the auxiliary switch means comprises a plurality of switches successively operable by movement of the movable wall of the other chamber.

24. In combination, an electric switch mechanism, fluid pressure responsive means to operate the switch mechanism when fluid pressure is communicated thereto and effective to restore the fluid pressure responsive means when communication of the fluid pressure is interrupted, fluid pressure conduit means communicating with the fluid pressure responsive means, a source of fluid pressure, a source of electric current, a valve operable to effect communication of fluid pressure from the source to the conduit means, electric circuit means to effect operation of the valve by current from the current source, means operable responsive to communication of fluid pressure to the conduit means to control the electric circuit means to effect restoring of the valve and interruption of fluid pressure communication to the conduit means to thereby effect restoring of the fluid pressure responsive means and switch mechanism and restoring of the electric circuit means to effect another operation of the valve and so on repeatedly.

25. In combination, a switch mechanism controlling an electric circuit, a first fluid pressure responsive means to operate the mechanism to make and break the electric circuit when fluid pressure is communicated thereto and to effect restoring thereof when communication of pressure is interrupted, auxiliary switch means, a second fluid pressure responsive means to operate the auxiliary switch means when fluid pressure is communicated thereto and to effect restoring thereof when communication of pressure is interrupted, a fluid pressure source connected by conduit means to the two fluid pressure responsive means, a source of electric current, a magnetic valve controlling the conduit means, circuit means to energize the magnetic valve by current from the current source to operate it to effect communication of pressure of the source to the two fluid pressure responsive means through the conduit means, the circuit means being controlled by the auxiliary switch means to effect restoring of the magnetic valve by response of the second fluid pressure responsive means, and means to delay operation of the auxiliary switch means until after making and breaking of the electric circuit by the switch mechanism.

26. The combination described in claim 25 and in which the parts are arranged so that restoring of the magnetic valve effects restoring of the two pressure responsive means and the auxiliary switch means, and the restored auxiliary switch means effects another operation of the magnetic valve and so on repeatedly.

27. In combination, a switch mechanism operable to make and break an electric circuit, a source of fluid pressure, fluid pressure conduit means communicating with the source, an electro-magnetic valve arranged to admit fluid pressure from the source to the conduit means upon operation thereof, a source of electric current, conductors supplying current from the source to the valve, auxiliary switch means, an electromagnetic relay having an energizing circuit normally supplied by current from the source under control of the auxiliary switch means and having contacts controlling the said conductors, two fluid pressure responsive means, responsive to the communication of pressure to the conduit means by an operation of the valve, one fluid pressure responsive means effecting an operation of the switch mechanism to make and break the said electric circuit, the other fluid pressure responsive means effecting operation of the auxiliary switch means to restore the relay, to effect restoring of the valve by the relay, to thereby effect restoring of both pressure responsive means, and means to delay operation of the auxiliary switch means by the said other pressure responsive means until after making and breaking of the said electric circuit by the said one pressure responsive means.

28. In an electro fluid pressure apparatus an electrically energizable circuit, a source of fluid pressure, a source of electric current, a current timing electric switch mechanism comprising a reciprocatory element movable by fluid pressure in one direction to close the switch and by continued pressure effected movement in the same direction, to open it, to initiate and interrupt the flow of electric current from the current source to the circuit, magnetic valve means for controlling communication of fluid pressure from the source to the fluid pressure movable element manually actuable contactor means for actuating the magnetic valve means and means for maintaining said magnetic valve means actuated independently of the manually actuable means until after the electric current is interrupted.

CHARLES H. RIPPL.